(12) United States Patent
Onoue (10) Patent No.: US 9,047,903 B2
(45) Date of Patent: Jun. 2, 2015

(54) PERPENDICULAR MAGNETIC RECORDING MEDIUM AND PROCESS FOR MANUFACTURE THEREOF

(75) Inventor: Takahiro Onoue, Singapore (SG)

(73) Assignee: WD Media (Singapore) Pte. Ltd., Singapore (SG)

(*) Notice: Subject to any disclaimer, the term of this patent is extended or adjusted under 35 U.S.C. 154(b) by 293 days.

(21) Appl. No.: 12/934,953

(22) PCT Filed: Mar. 26, 2009

(86) PCT No.: PCT/JP2009/056051
§ 371 (c)(1),
(2), (4) Date: Dec. 23, 2010

(87) PCT Pub. No.: WO2009/119709
PCT Pub. Date: Oct. 1, 2009

(65) Prior Publication Data
US 2011/0097603 A1    Apr. 28, 2011

(30) Foreign Application Priority Data

Mar. 26, 2008    (JP) ................................. 2008-082251

(51) Int. Cl.
*G11B 5/66* (2006.01)
*G11B 5/65* (2006.01)
*G11B 5/851* (2006.01)

(52) U.S. Cl.
CPC .. *G11B 5/66* (2013.01); *G11B 5/65* (2013.01); *G11B 5/851* (2013.01)

(58) Field of Classification Search
USPC .............. 428/826, 827, 828, 828.1, 829, 830
See application file for complete search history.

(56) References Cited

U.S. PATENT DOCUMENTS

| | | |
|---|---|---|
| 6,013,161 A | 1/2000 | Chen et al. |
| 6,063,248 A | 5/2000 | Bourez et al. |
| 6,068,891 A | 5/2000 | O'Dell et al. |
| 6,086,730 A | 7/2000 | Liu et al. |
| 6,099,981 A | 8/2000 | Nishimori |
| 6,103,404 A | 8/2000 | Ross et al. |
| 6,117,499 A | 9/2000 | Wong et al. |
| 6,136,403 A | 10/2000 | Prabhakara et al. |

(Continued)

FOREIGN PATENT DOCUMENTS

| | | |
|---|---|---|
| JP | 60-239916 A | 11/1985 |
| JP | 63-201912 A | 8/1988 |

(Continued)

*Primary Examiner* — Holly Rickman
*Assistant Examiner* — Lisa Chau (57) ABSTRACT

An object of the present invention is to provide a perpendicular magnetic recording medium in which each space between crystal grains of a first magnetic recording layer is so designed as to allow the layer to also have a function as a continuous layer, and a method of manufacturing a perpendicular magnetic recording medium. In a perpendicular magnetic recording medium 100 according to the present invention, a first magnetic recording layer 122a and a second magnetic recording layer 122b are ferromagnetic layers each having a granular structure in which a grain boundary part made of a non-magnetic substance is formed between crystal grains each grown in a column shape and, in the first magnetic recording layer 122a, an intergranular distance defined by an average of shortest distances between grain boundary parts each between a crystal grain and its adjacent crystal grain is equal to or shorter than 1 nm.

4 Claims, 4 Drawing Sheets

(56) References Cited

U.S. PATENT DOCUMENTS

| | | |
|---|---|---|
| 6,143,375 A | 11/2000 | Ross et al. |
| 6,145,849 A | 11/2000 | Bae et al. |
| 6,146,737 A | 11/2000 | Malhotra et al. |
| 6,149,696 A | 11/2000 | Jia |
| 6,150,015 A | 11/2000 | Bertero et al. |
| 6,156,404 A | 12/2000 | Ross et al. |
| 6,159,076 A | 12/2000 | Sun et al. |
| 6,164,118 A | 12/2000 | Suzuki et al. |
| 6,200,441 B1 | 3/2001 | Gornicki et al. |
| 6,204,995 B1 | 3/2001 | Hokkyo et al. |
| 6,206,765 B1 | 3/2001 | Sanders et al. |
| 6,210,819 B1 | 4/2001 | Lal et al. |
| 6,216,709 B1 | 4/2001 | Fung et al. |
| 6,221,119 B1 | 4/2001 | Homola |
| 6,248,395 B1 | 6/2001 | Homola et al. |
| 6,261,681 B1 | 7/2001 | Suekane et al. |
| 6,270,885 B1 | 8/2001 | Hokkyo et al. |
| 6,274,063 B1 | 8/2001 | Li et al. |
| 6,283,838 B1 | 9/2001 | Blake et al. |
| 6,287,429 B1 | 9/2001 | Moroishi et al. |
| 6,290,573 B1 | 9/2001 | Suzuki |
| 6,299,947 B1 | 10/2001 | Suzuki et al. |
| 6,303,217 B1 | 10/2001 | Malhotra et al. |
| 6,309,765 B1 | 10/2001 | Suekane et al. |
| 6,358,636 B1 | 3/2002 | Yang et al. |
| 6,362,452 B1 | 3/2002 | Suzuki et al. |
| 6,363,599 B1 | 4/2002 | Bajorek |
| 6,365,012 B1 | 4/2002 | Sato et al. |
| 6,381,090 B1 | 4/2002 | Suzuki et al. |
| 6,381,092 B1 | 4/2002 | Suzuki |
| 6,387,483 B1 | 5/2002 | Hokkyo et al. |
| 6,391,213 B1 | 5/2002 | Homola |
| 6,395,349 B1 | 5/2002 | Salamon |
| 6,403,919 B1 | 6/2002 | Salamon |
| 6,408,677 B1 | 6/2002 | Suzuki |
| 6,426,157 B1 | 7/2002 | Hokkyo et al. |
| 6,429,984 B1 | 8/2002 | Alex |
| 6,482,330 B1 | 11/2002 | Bajorek |
| 6,482,505 B1 | 11/2002 | Bertero et al. |
| 6,500,567 B1 | 12/2002 | Bertero et al. |
| 6,528,124 B1 | 3/2003 | Nguyen |
| 6,548,821 B1 | 4/2003 | Treves et al. |
| 6,552,871 B2 | 4/2003 | Suzuki et al. |
| 6,565,719 B1 | 5/2003 | Lairson et al. |
| 6,566,674 B1 | 5/2003 | Treves et al. |
| 6,571,806 B2 | 6/2003 | Rosano et al. |
| 6,628,466 B2 | 9/2003 | Alex |
| 6,664,503 B1 | 12/2003 | Hsieh et al. |
| 6,670,055 B2 | 12/2003 | Tomiyasu et al. |
| 6,682,807 B2 | 1/2004 | Lairson et al. |
| 6,683,754 B2 | 1/2004 | Suzuki et al. |
| 6,730,420 B1 | 5/2004 | Bertero et al. |
| 6,743,528 B2 | 6/2004 | Suekane et al. |
| 6,759,138 B2 | 7/2004 | Tomiyasu et al. |
| 6,778,353 B1 | 8/2004 | Harper |
| 6,795,274 B1 | 9/2004 | Hsieh et al. |
| 6,855,232 B2 | 2/2005 | Jairson et al. |
| 6,857,937 B2 | 2/2005 | Bajorek |
| 6,893,748 B2 | 5/2005 | Bertero et al. |
| 6,899,959 B2 | 5/2005 | Bertero et al. |
| 6,916,558 B2 | 7/2005 | Umezawa et al. |
| 6,939,120 B1 | 9/2005 | Harper |
| 6,946,191 B2 | 9/2005 | Morikawa et al. |
| 6,967,798 B2 | 11/2005 | Homola et al. |
| 6,972,135 B2 | 12/2005 | Homola |
| 7,004,827 B1 | 2/2006 | Suzuki et al. |
| 7,006,323 B1 | 2/2006 | Suzuki |
| 7,016,154 B2 | 3/2006 | Nishihira |
| 7,019,924 B2 | 3/2006 | McNeil et al. |
| 7,045,215 B2 | 5/2006 | Shimokawa |
| 7,070,870 B2 | 7/2006 | Bertero et al. |
| 7,090,934 B2 | 8/2006 | Hokkyo et al. |
| 7,099,112 B1 | 8/2006 | Harper |
| 7,105,241 B2 | 9/2006 | Shimokawa et al. |
| 7,119,990 B2 | 10/2006 | Bajorek et al. |
| 7,147,790 B2 | 12/2006 | Wachenschwanz et al. |
| 7,161,753 B2 | 1/2007 | Wachenschwanz et al. |
| 7,166,319 B2 | 1/2007 | Ishiyama |
| 7,166,374 B2 | 1/2007 | Suekane et al. |
| 7,169,487 B2 | 1/2007 | Kawai et al. |
| 7,174,775 B2 | 2/2007 | Ishiyama |
| 7,179,549 B2 | 2/2007 | Malhotra et al. |
| 7,184,139 B2 | 2/2007 | Treves et al. |
| 7,196,860 B2 | 3/2007 | Alex |
| 7,199,977 B2 | 4/2007 | Suzuki et al. |
| 7,208,236 B2 | 4/2007 | Morikawa et al. |
| 7,220,500 B1 | 5/2007 | Tomiyasu et al. |
| 7,229,266 B2 | 6/2007 | Harper |
| 7,239,970 B2 | 7/2007 | Treves et al. |
| 7,252,897 B2 | 8/2007 | Shimokawa et al. |
| 7,277,254 B2 | 10/2007 | Shimokawa et al. |
| 7,281,920 B2 | 10/2007 | Homola et al. |
| 7,292,329 B2 | 11/2007 | Treves et al. |
| 7,301,726 B1 | 11/2007 | Suzuki |
| 7,302,148 B2 | 11/2007 | Treves et al. |
| 7,305,119 B2 | 12/2007 | Treves et al. |
| 7,314,404 B2 | 1/2008 | Singh et al. |
| 7,320,584 B1 | 1/2008 | Harper et al. |
| 7,329,114 B2 | 2/2008 | Harper et al. |
| 7,375,362 B2 | 5/2008 | Treves et al. |
| 7,420,886 B2 | 9/2008 | Tomiyasu et al. |
| 7,425,719 B2 | 9/2008 | Treves et al. |
| 7,471,484 B2 | 12/2008 | Wachenschwanz et al. |
| 7,498,062 B2 | 3/2009 | Calcaterra et al. |
| 7,531,485 B2 | 5/2009 | Hara et al. |
| 7,537,846 B2 | 5/2009 | Ishiyama et al. |
| 7,549,209 B2 | 6/2009 | Wachenschwanz et al. |
| 7,569,490 B2 | 8/2009 | Staud |
| 7,597,792 B2 | 10/2009 | Homola et al. |
| 7,597,973 B2 | 10/2009 | Ishiyama |
| 7,608,193 B2 | 10/2009 | Wachenschwanz et al. |
| 7,632,087 B2 | 12/2009 | Homola |
| 7,656,615 B2 | 2/2010 | Wachenschwanz et al. |
| 7,682,546 B2 | 3/2010 | Harper |
| 7,684,152 B2 | 3/2010 | Suzuki et al. |
| 7,686,606 B2 | 3/2010 | Harper et al. |
| 7,686,991 B2 | 3/2010 | Harper |
| 7,695,833 B2 | 4/2010 | Ishiyama |
| 7,722,968 B2 | 5/2010 | Ishiyama |
| 7,733,605 B2 | 6/2010 | Suzuki et al. |
| 7,736,768 B2 | 6/2010 | Ishiyama |
| 7,755,861 B1 | 7/2010 | Li et al. |
| 7,758,732 B1 | 7/2010 | Calcaterra et al. |
| 7,833,639 B2 | 11/2010 | Sonobe et al. |
| 7,833,641 B2 | 11/2010 | Tomiyasu et al. |
| 7,910,159 B2 | 3/2011 | Jung |
| 7,911,736 B2 | 3/2011 | Bajorek |
| 7,924,519 B2 | 4/2011 | Lambert |
| 7,944,165 B1 | 5/2011 | O'Dell |
| 7,944,643 B1 | 5/2011 | Jiang et al. |
| 7,955,723 B2 | 6/2011 | Umezawa et al. |
| 7,983,003 B2 | 7/2011 | Sonobe et al. |
| 7,993,497 B2 | 8/2011 | Moroishi et al. |
| 7,993,765 B2 | 8/2011 | Kim et al. |
| 7,998,912 B2 | 8/2011 | Chen et al. |
| 8,002,901 B1 | 8/2011 | Chen et al. |
| 8,003,237 B2 | 8/2011 | Sonobe et al. |
| 8,012,920 B2 | 9/2011 | Shimokawa |
| 8,038,863 B2 | 10/2011 | Homola |
| 8,057,926 B2 | 11/2011 | Ayama et al. |
| 8,062,778 B2 | 11/2011 | Suzuki et al. |
| 8,064,156 B1 | 11/2011 | Suzuki et al. |
| 8,076,013 B2 | 12/2011 | Sonobe et al. |
| 8,092,931 B2 | 1/2012 | Ishiyama et al. |
| 8,100,685 B1 | 1/2012 | Harper et al. |
| 8,101,054 B2 | 1/2012 | Chen et al. |
| 8,125,723 B1 | 2/2012 | Nichols et al. |
| 8,125,724 B1 | 2/2012 | Nichols et al. |
| 8,137,517 B1 | 3/2012 | Bourez |
| 8,142,916 B2 | 3/2012 | Umezawa et al. |
| 8,163,093 B1 | 4/2012 | Chen et al. |
| 8,171,949 B1 | 5/2012 | Lund et al. |
| 8,173,282 B1 | 5/2012 | Sun et al. |
| 8,178,480 B2 | 5/2012 | Hamakubo et al. |

(56) References Cited

U.S. PATENT DOCUMENTS

| | | |
|---|---|---|
| 8,206,789 B2 | 6/2012 | Suzuki |
| 8,218,260 B2 | 7/2012 | Iamratanakul et al. |
| 8,247,095 B2 | 8/2012 | Champion et al. |
| 8,257,783 B2 | 9/2012 | Suzuki et al. |
| 8,298,609 B1 | 10/2012 | Liew et al. |
| 8,298,689 B2 | 10/2012 | Sonobe et al. |
| 8,309,239 B2 | 11/2012 | Umezawa et al. |
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B2 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0153169 A1* | 7/2005 | Watanabe et al. ...... 428/694 BM |
| 2005/0155554 A1 | 7/2005 | Saito |
| 2005/0167867 A1 | 8/2005 | Bajorek et al. |
| 2005/0186450 A1* | 8/2005 | Takenoiri et al. ............ 428/827 |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0204791 A1* | 9/2006 | Sakawaki et al. .......... 428/828.1 |
| 2006/0207890 A1 | 9/2006 | Staud |
| 2006/0222900 A1 | 10/2006 | Inamura et al. |
| 2006/0222902 A1* | 10/2006 | Mukai ........................ 428/827 |
| 2007/0070549 A1 | 3/2007 | Suzuki et al. |
| 2007/0245909 A1 | 10/2007 | Homola |
| 2008/0075845 A1 | 3/2008 | Sonobe et al. |
| 2008/0093760 A1 | 4/2008 | Harper et al. |
| 2009/0117408 A1* | 5/2009 | Umezawa et al. ............ 428/827 |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |

(56) References Cited

U.S. PATENT DOCUMENTS

| | | |
|---|---|---|
| 2013/0216865 A1 | 8/2013 | Yasumori et al. |
| 2013/0230647 A1 | 9/2013 | Onoue et al. |
| 2013/0314815 A1 | 11/2013 | Yuan et al. |
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |

FOREIGN PATENT DOCUMENTS

| | | |
|---|---|---|
| JP | 11-025439 A | 1/1999 |
| JP | 2003-346315 | 12/2003 |
| JP | 2006-309922 A | 11/2006 |
| JP | 2008-108395 A | 5/2008 |
| WO | 2007/114402 A1 | 10/2007 |
| WO | WO 2007114402 A1 * | 10/2007 |

* cited by examiner

| | NON-MAGNETIC SUBSTANCE | INTERGRANULAR DISTANCE | SNR | OVERWRITE CHARACTERISTIC |
|---|---|---|---|---|
| SECOND MAGNETIC RECORDING LAYER 122b | SiO$_2$+TiO$_2$ | LARGE | ○ | ○ |
| FIRST MAGNETIC RECORDING LAYER 122a | Cr$_2$O$_3$+SiO$_2$ | SMALL | | |
| SECOND MAGNETIC RECORDING LAYER 122b | SiO$_2$ | LARGE | × | ○ |
| FIRST MAGNETIC RECORDING LAYER 122a | Cr$_2$O$_3$+SiO$_2$ | SMALL | | |
| SECOND MAGNETIC RECORDING LAYER 122b | SiO$_2$ | SMALL | × | × |
| FIRST MAGNETIC RECORDING LAYER 122a | Cr$_2$O$_3$+SiO$_2$ | LARGE | | |

FIG. 4

PERPENDICULAR MAGNETIC RECORDING MEDIUM AND PROCESS FOR MANUFACTURE THEREOF

TECHNICAL FIELD

The present invention relates to a perpendicular magnetic recording medium implemented on an HDD (hard disk drive) of a perpendicular magnetic recording type or the like, and a method of manufacturing a perpendicular magnetic recording medium.

BACKGROUND ART

With an increase in capacity of information processing in recent years, various information recording technologies have been developed. In particular, the surface recording density of an HDD using magnetic recording technology is continuously increasing at an annual rate of approximately 100%. In recent years, an information recording capacity exceeding 160 GB per one magnetic disk with a 2.5-inch diameter for use in an HDD or the like has been desired. To fulfill such demands, an information recording density exceeding 250 Gbits per one square inch is desired to be achieved.

To attain a high recording density in a magnetic disk for use in an HDD or the like, a magnetic disk of a perpendicular magnetic recording type has been suggested in recent years. In a conventional in-plane magnetic recording type, the axis of easy magnetization of a magnetic recording layer is oriented in a plane direction of a base surface. In the perpendicular magnetic recording type, by contrast, the axis of easy magnetization is adjusted so as to be oriented in a direction perpendicular to the base surface. In the perpendicular magnetic recording type, compared with the in-plane recording type, a thermal fluctuation phenomenon can be more suppressed at the time of high-density recording, and therefore the perpendicular magnetic recording type is suitable for increasing the recording density.

Conventionally, as a magnetic recording layer, CoCrPt—$SiO_2$ or CoCrPt—$TiO_2$ having a granular structure has been widely used. In Co, a crystal of a hcp structure (a hexagonal close-packed crystal lattice) grows in a columnar shape, and Cr and $SiO_2$ (or $TiO_2$) are subjected to segregation to form a non-magnetic grain boundary. By using such a granular structure, physically independent fine magnetic grains can be easily formed, and a high recording density can be easily attained.

In the above perpendicular recording type, a magnetic-monopole-type perpendicular head is used to cause a magnetic field in a direction perpendicular to the magnetic recording layer. However, with the use of a magnetic-monopole-type perpendicular head alone, a magnetic flux from a magnetic monopole immediately tries to return to a return magnetic pole on an opposite side, and therefore it is impossible to apply a sufficiently strong magnetic field to the magnetic recording layer. Thus, a soft magnetic layer is provided under a magnetic recording layer of a perpendicular magnetic recording disk to form a path (magnetic path) for a magnetic flux in the soft magnetic layer, thereby making it possible to apply a strong magnetic field in a direction perpendicular to the magnetic recording layer. That is, the soft magnetic layer is a layer in which magnetizing directions are aligned based on the magnetic field at the time of writing to dynamically form a magnetic path.

However, when a strong magnetic field is applied to the magnetic recording layer, a leakage magnetic field to an adjacent track becomes large. From this, WATE (Wide Area Track Erasure) becomes a problem, which is a phenomenon where recorded information is lost over several μm with a write-target track being taken as a center. As a technique of reducing WATE, it is said to be important to set an inverted-magnetic-domain nucleation magnetic field Hn of the magnetic recording layer as being negative and set its absolute value as being large. To obtain a high (large absolute value) Hn, a CGC (Coupled Granular Continuous) medium has been devised (Patent Document 1), in which a thin film (continuous layer) is formed that shows a high perpendicular magnetic anisotropy above or below the magnetic recording layer having a granular structure.

Also, although a high recording density can be achieved with an improvement of a coercive force Hc of the magnetic recording medium, writing with a magnetic head tends to become difficult. Thus, with an improvement in saturation magnetization Ms, the continuous layer also has a role of improving writability, that is, an overwrite characteristic.

In other words, an object of providing a continuous layer onto the magnetic recording layer is to improve the inverted-magnetic-domain nucleation magnetic field Hn to reduce noise and improve the saturation magnetization Ms to also improve the overwrite characteristic. Note that, although the continuous layer is also referred to as an auxiliary recording layer or a cap layer, it is referred to as a continuous layer in the present application unless otherwise specified.

Patent Document 1: Japanese Unexamined Patent Application Publication No. 2003-346315

SUMMARY OF INVENTION

Problems to be Solved by the Invention

However, in the conventional technology, while the overwrite characteristic can be improved by the continuous layer having a high saturation magnetization Ms, a noise increase is invited. Since the continuous layer is positioned at an upper portion of the medium, an influence to the noise increase is large.

In general, in the perpendicular magnetic recording medium, the recording magnetic field strength significantly decreases with a further distance away from the recording head. The inventors have conceived that an ideal structure is such that the conventional function of the continuous layer is also included in the first magnetic recording layer to achieve an ideal flux reversal also with a weaker head magnetic field strength compared with a head magnetic field strength in an upper portion (a layer near a surface layer of the medium) of the medium. By using the structure of the present invention, an excellent overwrite characteristic can be more efficiently achieved. Also, since the first magnetic recording layer is positioned at a portion sufficiently away from the reproducing head, a contribution to a noise increase is also small.

The present invention has been devised in view of the above problem in the continuous layer provided to the perpendicular magnetic recording medium. An object of the present invention is to provide a perpendicular magnetic recording medium in which each space between crystal grains of the first magnetic recording layer is so designed as to allow the first magnetic recording layer to also have a function as a continuous layer, and a method of manufacturing a perpendicular magnetic recording medium.

Means for Solving the Problem

To solve the above problem, as a result of diligent studies by the inventors of the present invention, the inventors found that the overwrite characteristic is improved by setting the space between crystal grains of the first magnetic recording layer at a predetermined value, thereby completing the present invention.

That is, to solve the above problem, in a typical structure of a perpendicular magnetic recording medium according to the present invention, the perpendicular magnetic recording medium includes at least a first magnetic recording layer and a second magnetic recording layer in this order on a base, wherein the first magnetic recording layer and the second magnetic recording layer are ferromagnetic layers of a granular structure in which grain boundary parts made of a non-magnetic substance are each formed between crystal grains each grown in a columnar shape and, in the first magnetic recording layer, an intergranular distance defined by an average of shortest distances each between each of the crystal grains and its adjacent crystal grain is equal to or shorter than 1 nm.

With the structure in which the intergranular distance between each crystal grain and its adjacent crystal grain of the first magnetic recording layer is set to be equal to or shorter than 1 nm, the first magnetic recording layer can be provided with a function similar to that of the continuous layer. Therefore, it is possible to reliably enhance the inverted-magnetic-domain nucleation magnetic field Hn, improve a heat-resistant fluctuation characteristic, and improve the overwrite characteristic. Note that, if the intergranular distance between each crystal grain and its adjacent crystal grain in the first magnetic recording layer is equal to or longer than 1 nm, the function as the continuous layer cannot be achieved, and an improvement of the overwrite characteristic cannot be expected.

In the second magnetic recording layer, the intergranular distance defined by the average of the shortest distances between grain boundary parts each between each of the crystal grains and its adjacent crystal grain is preferably equal to or longer than 0.5 nm.

With this, a high coercive force Hc and a high SNR can be optimally maintained. Note that if the intergranular distance between the crystal grains in the first magnetic recording layer is equal to or shorter than 0.5 nm, the granular structure cannot be maintained, thereby decreasing the SNR.

When an average particle diameter of the crystal grains in the first magnetic recording layer is taken as A nm and an average particle diameter of the crystal grains in the second magnetic recording layer is taken as B nm, A>B may hold.

With this, in the first magnetic recording layer, while the function as a continuous layer is achieved, the overwrite characteristic can be improved. Also, in the second magnetic recording layer, a high coercive force Hc and a high SNR can be optimally maintained.

A ratio between the average particle diameter of the crystal grains in the first magnetic recording layer and the average particle diameter of the crystal grains in the second magnetic recording layer is preferably 1<A/B<1.2.

With this, the overwrite characteristic can be optimally improved. Note that if the ratio A/B between the average particle diameter of the crystal grains in the first magnetic recording layer and the average particle diameter of the crystal grains in the second magnetic recording layer is larger than 1.2, the overwrite characteristic is degraded.

A total thickness of the first magnetic recording layer and the second magnetic recording layer is preferably equal to or smaller than 15 nm.

The film thickness of the first magnetic recording layer is preferably equal to or smaller than 5 nm and, desirably 3 nm to 4 nm. This is because, if the thickness is smaller than 3 nm, composition separation of the second magnetic recording layer cannot be promoted and, if the thickness is larger than 4 nm, a R/W characteristic (read/write characteristic) is degraded. The film thickness of the second magnetic recording layer is preferably equal to or larger than 5 nm and, desirably 7 nm to 15 nm. This is because, if the thickness is smaller than 7 nm, a sufficient coercive force cannot be obtained and, if the thickness is larger than 15 nm, a high Hn cannot be obtained. Therefore, to obtain a high Hn, the total thickness of the first magnetic recording layer and the second magnetic recording layer is preferably equal to or smaller than 15 nm.

The first magnetic recording layer may have a film thickness approximately 0.2 to approximately 1 time larger than the film thickness of the second magnetic recording layer. A continuous layer is provided that magnetically continues in a direction of a base surface from the second magnetic recording layer to a side away from the base, and the film thickness of the first magnetic recording layer is preferably approximately 0.2 to approximately 2 times larger than a film thickness of the continuous layer. A continuous layer magnetically continuing in a direction of a base surface is provided on a side of the second magnetic recording layer away from the base, and the film thickness of the second magnetic recording layer is preferably approximately 0.7 to approximately 2 times larger than a film thickness of the continuous layer.

With this, while a high SNR is optimally maintained, an excellent overwrite characteristic can be obtained.

The non-magnetic substance included in the first magnetic recording layer preferably includes one or a plurality of oxides selected from the group of $SiO_2$, $TiO_2$, $Cr_2O_3$, $Ta_2O_5$, $Nb_2O_5$, $B_2O_3$, and $ZrO_2$. The non-magnetic substance is a substance in which a grain boundary part can be formed around magnetic particles so that an exchange interaction operation between crystal grains (magnetic particles or magnetic grains) is suppressed or interrupted, and can be any as long as it is a non-magnetic substance that cannot be incorporated into cobalt (Co). In particular, $SiO_2$ has an effect of promoting finer and more isolated (separated from an adjacent magnetic grain) magnetic grains, and $TiO_2$ has an effect of suppressing dispersion in particle diameter of the crystal grains. Also, $Cr_2O_3$ can increase the coercive force Hc. Furthermore, by combining these oxides for segregation over the grain boundaries of the magnetic recording layer, both of the advantages can be enjoyed.

The non-magnetic substance included in the second magnetic recording layer preferably includes one or a plurality of oxides selected from the group of $SiO_2$, $TiO_2$, $Cr_2O_3$, $Ta_2O_5$, $Nb_2O_5$, $B_2O_3$, and $ZrO_2$. With this, the grain boundary parts can be reliably formed, and the crystal grains can be clearly separated. Therefore, the SNR can be improved.

To solve the above problem, in a typical structure of a method of manufacturing a perpendicular magnetic recording medium according to the present invention, the perpendicular magnetic recording medium includes at least a first magnetic recording layer and a second magnetic recording layer in this order on a base. As the first magnetic recording layer, a magnetic target is used that includes oxygen or one or a plurality of oxides selected from the group of $SiO_2$, $TiO_2$, $Cr_2O_3$, $Ta_2O_5$, $Nb_2O_5$, $B_2O_3$, and $ZrO_2$, and a gas pressure of approximately 0.5 to approximately 5 Pa and a power of approximately 100 to approximately 700 W are set, thereby forming a ferromagnetic layer of a granular structure in which non-magnetic grain boundary parts are formed each between crystal grains each grown in a columnar shape; a magnetic target is used that includes oxygen or one or a plurality of oxides selected from the group of $SiO_2$, $TiO_2$, $Cr_2O_3$, $Ta_2O_5$, $NB_2O_5$, $B_2O_3$, and $ZrO_2$, and a gas pressure of approximately 0.5 to approximately 5 Pa and a power of approximately 100 to approximately 1000 W are set, thereby forming a ferromagnetic layer of a granular structure in which non-magnetic grain boundary parts are formed each between the crystal grains each grown in a columnar shape as the second magnetic recording layer; and in the first magnetic recording layer, an intergranular distance defined by an average of shortest distances between grain boundary parts each between a crystal grain and its adjacent crystal grain is equal to or shorter than 1 nm.

Components and description thereof based on a technical idea of the perpendicular magnetic recording medium described above and their description are also applicable to a method of manufacturing the perpendicular magnetic recording medium.

Effect of the Invention

In the perpendicular magnetic recording medium according to the present invention, each space between crystal grains of the first magnetic recording layer is so designed as to allow the first magnetic recording layer to also have a function as a continuous layer, and the SNR and the overwrite characteristic can be appropriately improved.

DESCRIPTION OF REFERENCE NUMERALS

100 . . . perpendicular magnetic recording medium
110 . . . disk base
112 . . . adhesion layer
114 . . . soft magnetic layer
114a . . . first soft magnetic layer
114b . . . spacer layer
114c . . . second soft magnetic layer
116 . . . preliminary ground layer
118 . . . ground layer
118a . . . first ground layer
118b . . . second ground layer
120 . . . non-magnetic granular layer
122 . . . magnetic recording layer
122a . . . first magnetic recording layer
122b . . . second magnetic recording layer
124 . . . continuous layer
126 . . . medium protective layer
128 . . . lubricating layer

BEST MODES FOR CARRYING OUT THE INVENTION

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference characters and are not redundantly described, and components not directly relating to the present invention are not shown in the drawings.

EMBODIMENTS

Figure 1:
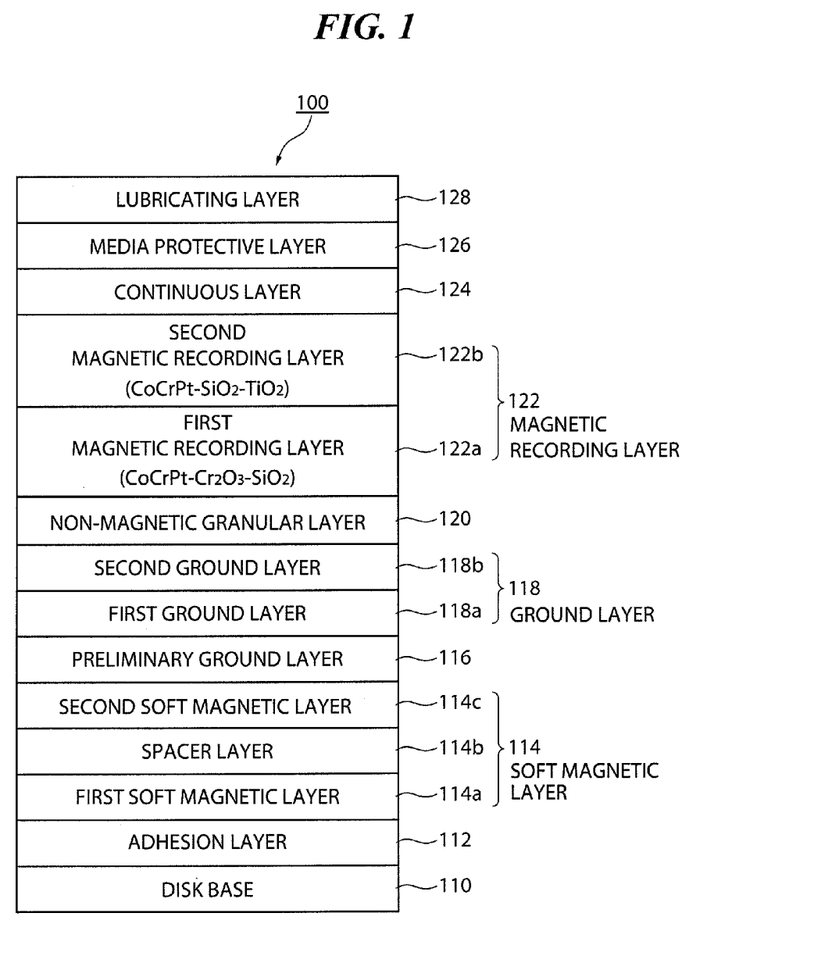
FIG. 1 A diagram for describing the structure of a perpendicular magnetic recording medium according to an embodiment.

An embodiment of the method of manufacturing a perpendicular magnetic recording medium according to the present invention is described. FIG. 1 is a diagram for describing the structure of a perpendicular magnetic recording medium 100 according to the present embodiment. The perpendicular magnetic recording medium 100 depicted in FIG. 1 is configured of a disk base 110, an adhesion layer 112, a first soft magnetic layer 114a, a spacer layer 114b, a second soft magnetic layer 114c, a preliminary ground layer 116, a first ground layer 118a, a second ground layer 118b, a non-magnetic granular layer 120, a first magnetic recording layer 122a, a second magnetic recording layer 122b, a continuous layer 124, a medium protective layer 126, and a lubricating layer 128. Note that the first soft magnetic layer 114a, the spacer layer 114b, and the second soft magnetic layer 114c together form a soft magnetic layer 114. The first ground layer 118a and the second ground layer 118b together form a ground layer 118. The first magnetic recording layer 122a and the second magnetic recording layer 122b together form a magnetic recording layer 122.

As described below, in the perpendicular magnetic recording medium 100 shown in the present embodiment, either or both of the first magnetic recording layer 122a and the second magnetic recording layer 122b of the magnetic recording layer 122 contain oxides of a plurality of types (hereinafter referred to as a "composite oxide"), thereby causing segregation of the composite oxide in a non-magnetic grain boundary.

For the disk base 110, a glass disk molded in a disk shape by direct-pressing amorphous aluminosilicate glass can be used. Note that the type, size, thickness, and others of the glass disk are not particularly restricted. A material of the glass disk can be, for example, aluminosilicate glass, soda lime glass, soda alumino silicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing the smooth, non-magnetic disk base 110 made of chemically-strengthened glass disk to be obtained.

On the disk base 110, the adhesion layer 112 to the continuous layer 124 are sequentially formed by DC magnetron sputtering, and the medium protective layer 126 can be formed by CVD. Then, the lubricating layer 128 can be formed by dip coating. Note that, in view of high productivity, using an in-line-type film forming method is also preferable. In the following, the structure of each layer and its manufacturing method are described.

The adhesion layer 112 is an amorphous ground layer formed in contact with the disk base 110, and includes a function of increasing a peel strength between the soft magnetic layer 114 formed thereon and the disk base 110. When the disk base 110 is made of amorphous glass, the adhesion layer 112 is preferably an amorphous alloy film so as to comply with that amorphous glass surface.

As the adhesion layer 112, for example, a CrTi-type amorphous layer can be selected.

The soft magnetic layer 114 is a layer in which a magnetic path is temporarily formed at the time of recording so as to let a magnetic flux pass through a recording layer in a perpendicular direction in a perpendicular magnetic recording type. By interposing the non-magnetic spacer layer 114b between the first soft magnetic layer 114a and the second soft magnetic layer 114c, the soft magnetic layer 114 can be configured to include Antiferro-magnetic exchange coupling (AFC). With this, magnetizing directions of the soft magnetic layer 114 can be aligned with high accuracy along the magnetic path (magnetic circuit), the number of perpendicular components in the magnetizing direction becomes extremely small, and therefore noise occurring from the soft magnetic layer 114 can be reduced. As the composition of the first soft magnetic layer 114a and the second soft magnetic layer 114c, a cobalt-type alloy, such as CoTaZr; a Co—Fe-type alloy, such as CoCrFeB; a Ni—Fe-type alloy having a [Ni—Fe/Sn]n multilayered structure or the like can be used.

The preliminary ground layer 116 is a non-magnetic alloy layer, and includes an operation of protecting the soft magnetic layer 114 and a function of orienting in a disk perpendicular direction an easy axis of magnetization of a hexagonal close-packed structure (hcp structure) included in the ground layer 118 formed on the preliminary ground layer. In the preliminary ground layer 116, a (111) surface of a face-centered cubic structure (fcc structure) or a (110) surface of a body-centered cubic structure (bcc structure) are preferably parallel to a main surface of the disk base 110. Also, the preliminary ground layer 116 may have a structure in which these crystal structures and amorphous are mixed. As a material of the preliminary ground layer 116, a selection can be made from Ni, Cu, Pt, Pd, Zr, Hf, Nb, and Ta. Furthermore, an alloy including any of these metals as a main element and any one or more additional elements from among Ti, V, Ta, Cr, Mo, and W may be used. For example, NiW, CuW, or CuCr can be suitably selected as an fcc structure, and Ta can be suitably selected as a bcc structure.

The ground layer 118 has a hcp structure, and has an operation of growing crystals of the hcp structure of the magnetic recording layer 122 as a granular structure. Therefore, as the crystal orientation of the ground layer 118 is higher, that is, a (0001) surface of a crystal of the ground layer 118 is more parallel to the main surface of the disk base 110, the orientation of the magnetic recording layer 122 can be improved. As a material of the ground layer 118, Ru is typical. Other than that, a selection can be made from RuCr and RuCo. Ru has a hcp structure, and a lattice space of the crystal is similar to that of Co. Therefore, the magnetic recording layer 122 having Co as a main component can be oriented in good condition.

When the ground layer 118 is made of Ru, by changing the gas pressure at the time of sputtering, a two-layer structure made of Ru can be achieved. Specifically, when the second ground layer 118b on an upper-layer side is formed, the gas pressure of Ar is made higher than that when the first ground layer 118a on a lower-layer side is formed. When the gas pressure is made higher, a free traveling distance of Ru ions to be sputtered is shortened, and therefore the film-forming speed becomes slow, thereby improving the crystal separation ability. Also, with a high pressure, the size of the crystal lattice becomes smaller. Since the size of the crystal lattice of Ru is larger than that of the crystal lattice of Co, when the crystal lattice of Ru is made smaller, it becomes closer to that of Co, thereby further improving the crystal orientation of the Co granular layer.

The non-magnetic granular layer 120 is a non-magnetic granular layer. By forming a non-magnetic granular layer on the hcp crystal structure of the ground layer 118 and, on that layer, making a granular layer of the first magnetic recording layer 122a grown, an operation of separating the magnetic granular layer from a stage of initial growth (leading) is provided. The composition of the non-magnetic granular layer 120 can be a granular structure by forming a grain boundary by causing segregation of non-magnetic substance between non-magnetic crystal grains made of a Co-type alloy. In particular, CoCr—$SiO_2$ and CoCrRu—$SiO_2$ can be suitably used and, furthermore, in place of Ru, Rh (rhodium), Pd (palladium), Ag (silver), Os (osmium), Ir (iridium), and Au (gold) can also be used. Still further, the non-magnetic substance is a substance in which a grain boundary part can be formed around magnetic particles so that an exchange interaction operation between magnetic particles (magnetic grains) is suppressed or interrupted, and can be any as long as it is a non-magnetic substance that is not incorporated into cobalt (Co). Examples can include silicon oxide ($SiO_x$), chrome (Cr), chrome oxide ($CrO_2$), titanium oxide ($TiO_2$), zircon oxide ($ZrO_2$), and tantalum oxide ($Ta_2O_5$).

The magnetic recording layer 122 is a ferromagnetic layer having a granular structure in a columnar shape in which a grain boundary is formed by causing segregation of a non-magnetic substance around magnetic particles made of a hard magnetic body selected from a Co-type alloy, a Fe-type alloy, and a Ni-type alloy. By providing the non-magnetic granular layer 120, these magnetic particles can make an epitaxial growth continuously from their granular structure. In the present embodiment, the magnetic recording layer is configured of the first magnetic recording layer 122a and the second magnetic recording layer 122b different in composition and film thickness. In both of the first magnetic recording layer 122a and the second magnetic recording layer 122b, as a non-magnetic substance, an oxide, such as $SiO_2$, $Cr_2O_3$, $TiO_2$, $B_2O_3$, and $Fe_2O_3$; a nitride, such as BN; or a carbide, such as $B_4C_3$ can be suitably used.

Also, in the present embodiment, in the first magnetic recording layer 122a, an intergranular distance defined by an average of shortest distances between grain boundary parts each between each of magnetic particles (crystal grains) and its adjacent magnetic particle is equal to or shorter than 1 nm. With the structure in which the intergranular distance between each crystal grain and its adjacent crystal grain of the first magnetic recording layer 122a is set to be equal to or shorter than 1 nm, the first magnetic recording layer 122a can be provided with a function similar to that of the continuous layer 124, which will be described further below. Therefore, it is possible to reliably enhance an inverted-magnetic-domain nucleation magnetic field Hn, improve a heat-resistant fluctuation characteristic, and improve the overwrite characteristic. Note that, if the intergranular distance between each crystal grain and its adjacent crystal grain in the first magnetic recording layer 122a is equal to or longer than 1 nm, the function as the continuous layer 24 cannot be achieved, and an improvement of the overwrite characteristic cannot be expected.

Furthermore, in the present embodiment, it is assumed that A>B when an average particle diameter of the magnetic particles (crystal grains) in the first magnetic recording layer 122a is A nm and an average particle diameter of the magnetic particles (crystal grains) in the second magnetic recording layer 122b is B nm. With this, in the first magnetic recording layer 122a, while the function as the continuous layer 124 is achieved, the overwrite characteristic can be improved and, in the second magnetic recording layer 122b, a high coercive force Hc and a high SNR can be optimally maintained.

Still further, in the present embodiment, in either one or both of the first magnetic recording layer 122a and the second magnetic recording layer 122b, two or more non-magnetic substances can be used in a compounding manner. Here, although the type of non-magnetic substance contained is not restricted, $SiO_2$ and $TiO_2$ are in particular preferably included and, next, in place of/in addition to either one, $Cr_2O_3$ can be suitably used. For example, the first magnetic recording layer 122a can contain $Cr_2O_3$ and $SiO_2$, as an example of the composite oxide (oxides of a plurality of types), in a grain boundary part to form an hcp crystal structure of CoCrPt—$Cr_2O_3$—$SiO_2$. Also, for example, the second magnetic recording layer 122b can contain $SiO_2$ and $TiO_2$, as an example of the composite oxide, in a grain boundary part to form an hcp crystal structure of CoCrPt—$SiO_2$—$TiO_2$.

The continuous layer 124 is a magnetically continuous layer (also referred to as a continuous layer) in an in-plane direction on the magnetic recording layer 122 having a granular structure. By providing the continuous layer 124, in addition to a high-density recording property and a low-noise property, it is possible to enhance the inverted-magnetic-domain nucleation magnetic field Hn, improve the heat-resistant fluctuation characteristic, and improve the overwrite characteristic.

The medium protective layer 126 can be formed by forming a film out of carbon by CVD while keeping a vacuum state. The medium protective layer 126 is a protective layer for protecting the perpendicular magnetic recording medium from a shock of the magnetic head. In general, a carbon film formed by CVD has an improved film hardness compared with the one formed by sputtering, and therefore the perpendicular magnetic recording medium can be more effectively protected from a shock from the magnetic head.

The lubricating layer 128 can be formed by forming a film out of perfluoropolyether (PFPE) by dip coating. PFPE has a molecular structure in a long chain shape, and is coupled to an N atom on the surface of the medium protective layer 126 with high affinity. With this operation of the lubricating layer 128, a damage or loss of the medium protective layer 126 can be prevented even if the magnetic head makes contact with the surface of the perpendicular magnetic recording medium 100.

With the above manufacturing processes, the perpendicular magnetic recording medium 100 can be obtained. In the following, effectiveness of the present invention is described by using an example and comparative examples.

Examples and Evaluation

On the disk base 110, by using a vacuumed film forming device, the adhesion layer 112 to the continuous layer 124 were sequentially formed in an Ar atmosphere by DC magnetron sputtering. The adhesive layer 112 was of CrTi. In the soft magnetic layer 114, the composition of the first soft magnetic layer 114a and the second soft magnetic layer 114c was of FeCoTaZr, and the composition of the spacer layer 114b was of Ru. The composition of the preliminary ground layer 116 was of an NiW alloy with an fcc structure. In the ground layer 118, the first ground layer 118a was formed out of Ru under low-pressure Ar, and the second ground layer 118b was formed out of Ru under high-pressure Ar. The composition of the non-magnetic granular layer 120 was of non-magnetic CoCr—$SiO_2$. The magnetic recording layer 122 was formed with a structure in the example and comparative examples below. The composition of the continuous layer 124 was of CoCrPtB. As for the medium protective layer 126, a film was formed by using $C_2H_4$ and CN by CVD, and the lubricating layer 128 was formed by using PFPE by dip coating.

In the present embodiment, the film thickness of the continuous layer 124 was 7 nm, the film thickness of the first magnetic recording layer 122a is 3 nm, and the film thickness of the second magnetic recording layer 122b was 10 nm.

Figure 2A:
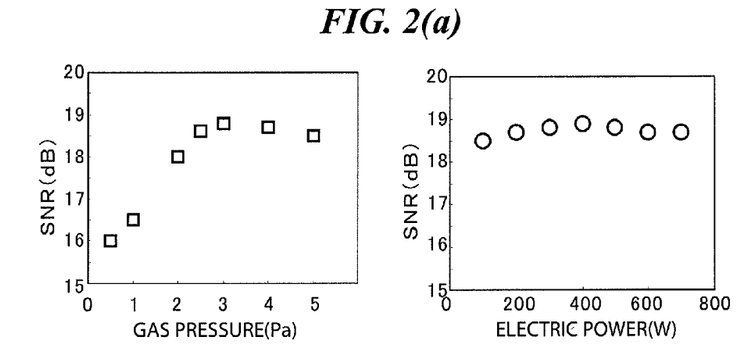
FIG. 2 A descriptive diagram for describing a relation between gas pressure and SNR and a relation between input power and SNR characteristic at the time of film-forming a magnetic recording layer.
Figure 2B:
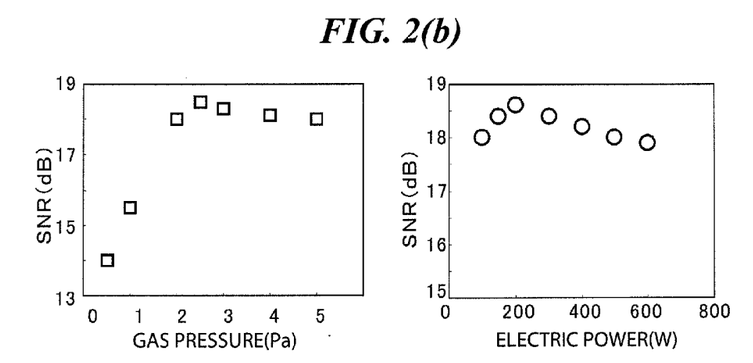

FIG. 2 is a descriptive diagram for describing a relation between gas pressure and SNR and a relation between input power and SNR at the time of forming the magnetic recording layer 122. In particular, FIG. 2(a) is a diagram showing a relation between a condition (gas pressure and input power) for forming the second magnetic recording layer 122b, and SNR, with a film thickness of the continuous layer 124 being fixed at 7 nm, a film thickness of the first magnetic recording layer 122a at 3 nm, an average particle diameter of magnetic particles at 7 nm, and an average intergranular distance at 0.8 nm. Also, FIG. 2(b) is a diagram showing a relation between a condition (gas pressure and input power) for forming the first magnetic recording layer 122a, and SNR, with a film thickness of the continuous layer 124 being fixed at 7 nm, a film thickness of the second magnetic recording layer 122b at 10 nm, an average particle diameter of magnetic particles at 6 nm, and an average intergranular distance at 1.2 nm. Note that, in either case, a film-forming time is adjusted so that the product of the input power and the film-forming time is constant, thereby making the film thickness constant. In this case, in the first magnetic recording layer 122a, an hcp crystal structure of CoCrPt—$Cr_2O_3$—$SiO_2$ was formed by including $Cr_2O_3$ and $SiO_2$ as an example of a composite oxide. Also, in the second magnetic recording layer 122b, an hcp crystal structure of CoCrPt—$SiO_2$—$TiO_2$ was formed by including $SiO_2$ and $TiO_2$ as an example of a composite oxide.

As depicted in FIG. 2(a), in the second magnetic recording layer 122b, an optimum SNR can be obtained by forming a film at a gas pressure of 3 Pa and an input power of 400 W. The average particle diameter and intergranular distance of the magnetic particles of the second magnetic recording layer 122b at this time can be measured by a Transmission Electron Microscope (TEM), and the results were such that the average particle diameter was 6.7 nm and the average intergranular distance was 1.4 nm.

In a specific example to find an average particle diameter of crystal grains, all crystal grains included in an area of 100 $nm^2$ in the measurement results obtained by the TEM are subjected to circular approximation by using the area. Then, by calculating an average diameter of the crystal grains subjected to circular approximation, an average particle diameter of the crystal grains can be found. In a specific example to find an intergranular distance, similarly, the intergranular distance can be found by measuring a shortest distance between each crystal grain and its adjacent crystal grain similarly within a 100 $nm^2$, which is a measurement range of the TEM, and averaging the results. In another example to find an intergranular distance, the intergranular distance can be found by measuring a distance between centers of crystal grains subjected to circular approximation by using the area to find an average intercenter distance, and subtracting an average diameter (obtained by doubling a radius) from this average intercenter distance.

As depicted in FIG. 2(b), in the first magnetic recording layer 122a, an optimum overwrite characteristic can be obtained by forming a film at a gas pressure of 2.5 Pa and an input power of 200 W. An average particle diameter of magnetic particles of the first magnetic recording layer 122a at this time can be measured by a transmission electron microscope, and the results were such that the average particle diameter was 6.3 nm and the average intergranular distance was 0.6 nm.

In the following, it is assumed as a first example that the first magnetic recording layer 122a has an average particle diameter of the magnetic particles of 7 nm and an average intergranular distance of 0.7 nm and the second magnetic recording layer 122b has an average particle diameter of the magnetic particles of 6.7 nm and an average intergranular distance of 1.3 nm, that is, the first magnetic recording layer 122a> the second magnetic recording layer 122b regarding the average particle diameter of the magnetic particles. Also, it is assumed as a comparative example that the first magnetic recording layer 122a has an average particle diameter of the magnetic particles of 6.7 nm and an average intergranular distance of 1.3 nm and the second magnetic recording layer 122b has an average particle diameter of the magnetic particles of 7 nm and an average intergranular distance of 0.7 nm, that is, the first magnetic recording layer 122a<the second magnetic recording layer 122b regarding the average particle diameter of the magnetic particles.

Figure 3:
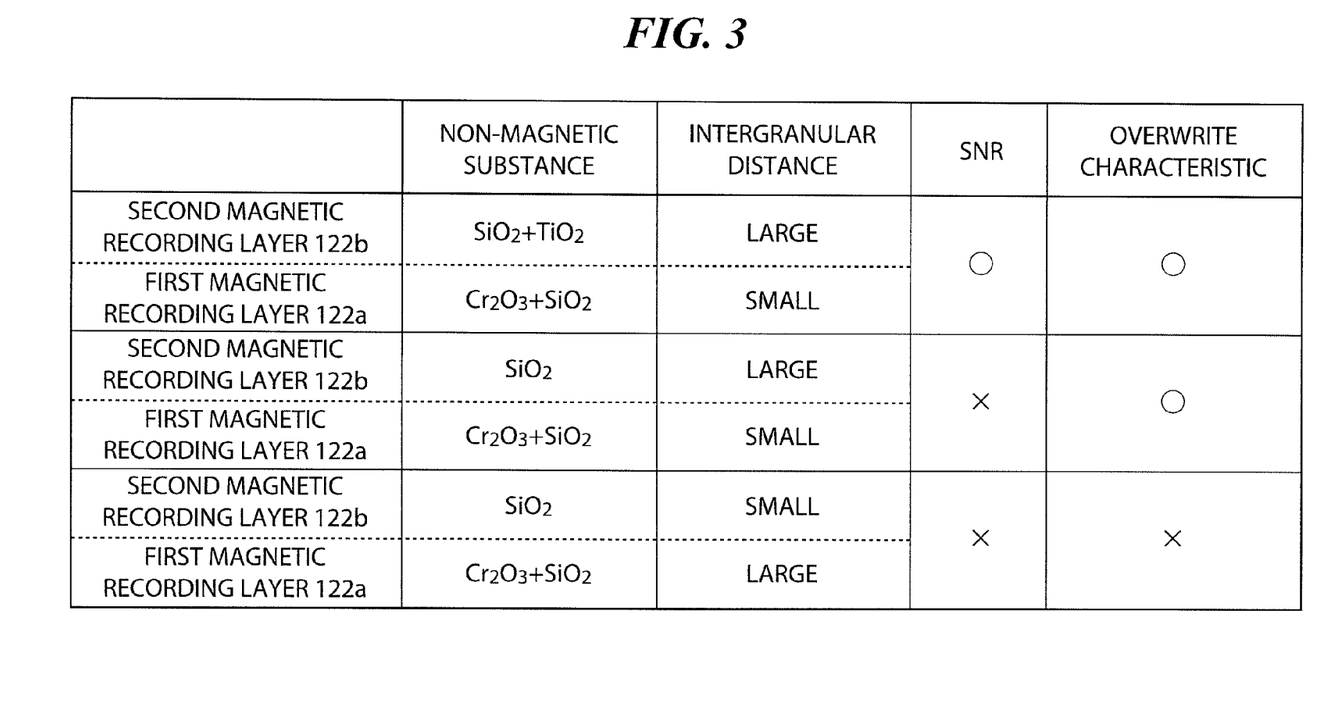
FIG. 3 A descriptive diagram for describing a relation between an intergranular distance of magnetic particles of a first magnetic recording layer and an intergranular distance of magnetic particles of a second magnetic recording layer, and relations with an overwrite characteristic and SNR.

FIG. 3 is a descriptive diagram for describing a relation between an average intergranular distance of magnetic particles of the first magnetic recording layer 122a and an average intergranular distance of magnetic particles of the second magnetic recording layer 122b, and relations with an overwrite characteristic and SNR.

As depicted in FIG. 3, when the average intergranular distance of magnetic particles included in the first magnetic recording layer 122a is shorter than the average intergranular distance of magnetic particles included in the second magnetic recording layer 122b, an excellent overwrite characteristic can be obtained, compared with the case in which the average intergranular distance of magnetic particles included in the first magnetic recording layer 122a is larger than the average intergranular distance of magnetic particles included in the second magnetic recording layer 122b.

Also, with the average particle diameter of magnetic particles in the first magnetic recording layer 122a being larger by approximately 0.3 nm than the average particle diameter of magnetic particles in the second magnetic recording layer 122b, the overwrite characteristic can be optimally improved. Note that, as depicted in the comparative example, when the average particle diameter of magnetic particles in the first magnetic recording layer 122a is smaller by approximately 0.3 nm than the average particle diameter of magnetic particles in the second magnetic recording layer 122b, the overwrite characteristic is degraded.

Also, with the average particle diameter of magnetic particles in the first magnetic recording layer 122a set as being larger by approximately 0.3 nm than the average particle diameter of magnetic particles in the second magnetic recording layer 122b, the intergranular distance between the magnetic particles in the first magnetic recording layer 122a can be easily set as being equal to or shorter than 1 nm. As a result, the overwrite characteristic can be optimally improved. Note that if the intergranular distance between the magnetic particles in the first magnetic recording layer 122a is equal to or longer than 1 nm, no improvement in overwrite characteristic can be expected.

Furthermore, with the average particle diameter of magnetic particles in the first magnetic recording layer 122a set as being larger by approximately 0.3 nm than the average particle diameter of magnetic particles in the second magnetic recording layer 122b, the intergranular distance between the magnetic particles in the second magnetic recording layer 122b can be easily set as being equal to or longer than 0.5 nm. As a result, a high coercive force Hc and a high SNR can be optimally maintained. Note that if the intergranular distance between the magnetic particles in the second magnetic recording layer 122b is equal to or shorter than 0.5 nm, the granular structure cannot be maintained, thereby decreasing the SNR.

With the aim of improving an SNR while achieving an excellent overwrite characteristic, in a second embodiment, the first magnetic recording layer 122a was configured to include $Cr_2O_3$ and $SiO_2$ as an example of a composite oxide to form an hcp crystal structure of CoCrPt—$Cr_2O_3$—$SiO_2$, and the second magnetic recording layer 122b was configured to include $SiO_2$ and $TiO_2$ as an example of a composite oxide to form an hcp crystal structure of CoCrPt—$SiO_2$—$TiO_2$.

As depicted in FIG. 3, with the second magnetic recording layer 122b being formed so as to include a composite oxide of $SiO_2$ and $TiO_2$, characteristics of a plurality of oxides can be obtained. Therefore, noise was reduced by further making the magnetic grains of the magnetic recording layer 122 finer and more isolated and, while an excellent overwrite characteristic was maintained, the SNR was able to be improved.

In particular, $SiO_2$ has an effect of promoting finer and more isolated magnetic grains, and $TiO_2$ has an effect of suppressing dispersion in particle diameter of the crystal grains. By combining these oxides for segregation over the grain boundary parts of the magnetic recording layer 122, both of the advantages can be enjoyed.

Figure 4:
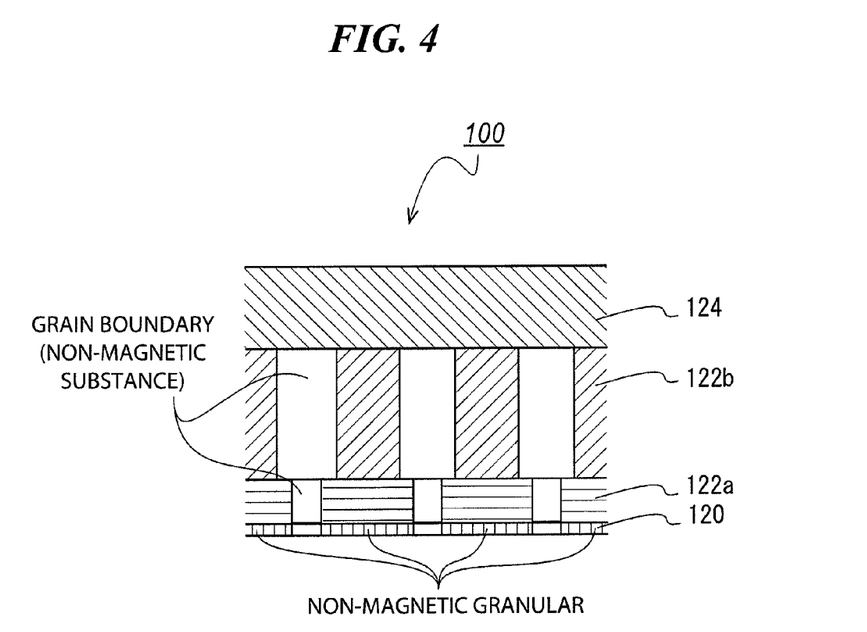
FIG. 4 A descriptive diagram for describing a perpendicular magnetic recording medium manufactured by using a method of manufacturing a perpendicular magnetic recording medium according to an embodiment.

FIG. 4 is a descriptive diagram for describing the perpendicular magnetic recording medium 100 manufactured by using the method of manufacturing a perpendicular magnetic recording medium according to the present embodiment.

As depicted in FIG. 4, the perpendicular magnetic recording medium 100 manufactured by using the method of manufacturing a perpendicular magnetic recording medium according to the present embodiment is formed so that the intergranular distance between each magnetic particle (crystal grain) and its adjacent magnetic particle (crystal grain) in the first magnetic recording layer 122a is shorter than the intergranular distance between each magnetic particle (crystal grain) and its adjacent magnetic particle (crystal grain) in the second magnetic recording layer 122b. For this reason, the first magnetic recording layer 122a has a function similar to that of the continuous layer 124. Therefore, the overwrite characteristic can be reliably improved.

According to the above structure, the second magnetic recording layer can have a function as a continuous layer. Therefore, even if a head magnetic field that is weaker compared with an upper portion of the medium is applied, an ideal flux reversal can be achieved, and the medium can appropriately exert its function. With this, the SNR and overwrite characteristic can be appropriately improved.

In the foregoing, the preferred examples of the present invention have been described with reference to the attached drawings. Needless to say, however, the present invention is not restricted by such examples. It is clear that the person skilled in the art can conceive various modification examples or corrected examples within a range described in the scope of claims for patent, and it is understood that these examples reasonably belong to the technological scope of the present invention.

For example, in the above embodiments and examples, the magnetic recording layer is formed of two layers, that is, the first magnetic recording layer and the second magnetic recording layer. However, even when the magnetic recording layer is formed of three or more layers, an advantage of the present invention can be similarly achieved by at least setting an average particle diameter of magnetic grains of a lower magnetic recording layer as being larger than the average particle diameter of magnetic grains of an upper magnetic recording layer.

INDUSTRIAL APPLICABILITY

The present invention can be used as a perpendicular magnetic recording medium implemented on an HDD (hard disk drive) of a perpendicular magnetic recording type or the like, and a method of manufacturing a perpendicular magnetic recording medium.

The invention claimed is:

1. A perpendicular magnetic recording medium comprising:
a base;
a recording layer consisting of a first magnetic recording layer 3 nm or more and less than 5 nm thick and a second magnetic recording layer 7 nm or more and less than 15 nm thick, in this order on the base, and
a continuous layer that comprises a material whose composition differs from that of a material that comprises the second magnetic recording layer and magnetically continues in a direction of a base surface is provided on a side of the second magnetic recording layer away from the base,
wherein
the first magnetic recording layer and the second magnetic recording layer are ferromagnetic layers of a granular structure in which grain boundary parts made of a non-magnetic substance are each formed between crystal grains each grown in a columnar shape, and
a first intergranular distance defined by an average of shortest distances between each of the crystal grains and its adjacent crystal grain in the first magnetic recording layer is shorter than a second intergranular distance defined by an average of shortest distances between grain boundary parts each between each of the crystal grains and its adjacent crystal grain in the second magnetic recording layer,
wherein A>B when an average particle diameter of the crystal grains in the first magnetic recording layer is taken as A nm and an average particle diameter of the crystal grains in the second magnetic recording layer is taken as B nm,
wherein a ratio between the average particle diameter of the crystal grains in the first magnetic recording layer and the average particle diameter of the crystal grains in the second magnetic recording layer is 1<A/B<1.2,
wherein the non-magnetic substance included in the first magnetic recording layer includes one or a plurality of oxides selected from the group of $SiO_2$, $TiO_2$, $Cr_2O_3$, $Ta_2O_5$, $Nb_2O_5$, $B_2O_3$, and $ZrO_2$, and
wherein the non-magnetic substance included in the second magnetic recording layer includes one or a plurality of oxides selected from the group of $SiO_2$, $TiO_2$, $Cr_2O_3$, $Ta_2O_5$, $Nb_2O_5$, $B_2O_3$, and $ZrO_2$.

2. The perpendicular magnetic recording medium according to claim 1, wherein a total thickness of the first magnetic recording layer and the second magnetic recording layer is equal to or smaller than 15 nm.

3. The perpendicular magnetic recording medium according to claim 1, wherein the film thickness of the first magnetic recording layer is approximately 0.2 to approximately 2 times larger than a film thickness of the continuous layer.

4. The perpendicular magnetic recording medium according to claim 1, wherein the film thickness of the second magnetic recording layer is approximately 0.7 to approximately 2 times larger than a film thickness of the continuous layer.

* * * * *